(12) United States Patent
Bayer et al.

(10) Patent No.: US 8,375,582 B2
(45) Date of Patent: Feb. 19, 2013

(54) METHOD AND APPARATUS FOR PRODUCING AND/OR REPAIRING AN INTEGRALLY BLADED ROTOR BY INDUCTIVE DIFFUSION WELDING

(75) Inventors: Erwin Bayer, Dachau (DE); Ulrich Knott, Munich (DE); Karl-Hermann Richter, Markt Indersdorf (DE)

(73) Assignee: MTU Aero Engines GmbH, Munich (DE)

( * ) Notice: Subject to any disclaimer, the term of this patent is extended or adjusted under 35 U.S.C. 154(b) by 1014 days.

(21) Appl. No.: 11/815,961

(22) PCT Filed: Feb. 4, 2006

(86) PCT No.: PCT/DE2006/000174
§ 371 (c)(1),
(2), (4) Date: Aug. 9, 2007

(87) PCT Pub. No.: WO2006/084439
PCT Pub. Date: Aug. 17, 2006

(65) Prior Publication Data
US 2008/0148566 A1 Jun. 26, 2008

(30) Foreign Application Priority Data
Feb. 10, 2005 (DE) .................. 10 2005 006 047

(51) Int. Cl.
*B21K 25/00* (2006.01)
*B23K 13/01* (2006.01)
*B23Q 7/00* (2006.01)
*F01D 5/30* (2006.01)

(52) U.S. Cl. ....... 29/889.21; 29/559; 219/617; 219/672; 228/193; 416/213 R

(58) Field of Classification Search ............. 29/23.51, 29/402.03, 402.08, 889.1, 889.21, 889.23, 29/889.7, 559; 219/617, 672; 228/119, 193; 416/213 R, 223 R, 241 R
See application file for complete search history.

(56) References Cited

U.S. PATENT DOCUMENTS

| | | | |
|---|---|---|---|
| 2,347,034 A * | 4/1944 | Doran | 416/191 |
| 3,414,958 A * | 12/1968 | Anderson | 269/37 |
| 4,096,615 A * | 6/1978 | Cross | 29/889.21 |
| 4,529,452 A | 7/1985 | Walker | |
| 4,640,454 A | 2/1987 | Yamamoto et al. | |
| 4,864,706 A * | 9/1989 | Jenkel | 29/889.21 |
| 4,873,751 A * | 10/1989 | Walker et al. | 29/889.1 |
| 4,883,216 A | 11/1989 | Patsfall | |
| 5,099,573 A | 3/1992 | Krauss et al. | |
| 5,197,190 A * | 3/1993 | Coolidge | 29/889.1 |
| 5,511,949 A | 4/1996 | Thore | |
| 5,544,873 A * | 8/1996 | Vickers et al. | 269/47 |
| 5,711,195 A * | 1/1998 | Koelling | 82/1.11 |

(Continued)

FOREIGN PATENT DOCUMENTS

| | | | |
|---|---|---|---|
| EP | 0 376 874 A2 | 7/1990 | |
| EP | 0 418 606 A1 | 3/1991 | |

(Continued)

*Primary Examiner* — Alexander P Taousakis
(74) *Attorney, Agent, or Firm* — Crowell & Moring LLP

(57) ABSTRACT

A method and apparatus for the fabrication and/or repair of an integrally bladed rotor, specifically of an integrally bladed gas turbine rotor, is disclosed. At least one rotor blade is joined to a main rotor body for fabrication and/or repair. The joining is carried out by diffusion welding.

3 Claims, 2 Drawing Sheets

U.S. PATENT DOCUMENTS

| | | |
|---|---|---|
| 6,438,838 B1 | 8/2002 | Meier et al. |
| 6,595,401 B2 * | 7/2003 | Collot et al. ............... 228/44.3 |
| 6,814,544 B2 * | 11/2004 | Tsukamoto et al. ........ 416/96 R |
| 6,933,459 B2 * | 8/2005 | Helder et al. ............... 219/117.1 |
| 7,258,348 B2 * | 8/2007 | Carrier ......................... 279/4.07 |

FOREIGN PATENT DOCUMENTS

| | | |
|---|---|---|
| JP | 2001-105158 | 4/2001 |
| WO | WO 2005/024185 | 3/2005 |

* cited by examiner

METHOD AND APPARATUS FOR PRODUCING AND/OR REPAIRING AN INTEGRALLY BLADED ROTOR BY INDUCTIVE DIFFUSION WELDING

BACKGROUND AND SUMMARY OF THE INVENTION

This application claims the priority of International Application No. PCT/DE2006/000174, filed Feb. 4, 2006, and German Patent Document No. 10 2005 006 047.1, filed Feb. 10, 2005, the disclosures of which are expressly incorporated by reference herein.

The invention relates to a method and apparatus for the fabrication and/or repair of an integrally bladed rotor, specifically of an integrally bladed gas turbine rotor.

Gas turbine rotors are increasingly being designed as integrally bladed rotors. Integrally bladed rotors are also designated as a blisk (bladed disk) or a bling (bladed ring), depending on whether a disk-shaped main rotor body or an annular main rotor body is used.

In the fabrication of integrally bladed rotors linear friction welding is used in the prior art to join the rotor blades to a main rotor body. In linear friction welding an upset pressure of a magnitude between 50 N/mm² and 75 N/mm² is exerted on the joint surfaces. Because of these high upset forces, the blades have to be chucked in a special clamping collar. This is complicated and expensive. Furthermore, extensive reworking of the joint surfaces is frequently necessary after linear friction welding. Thus, a plurality of disadvantages is associated with linear friction welding in the fabrication of integrally bladed rotors.

The blades of an integrally bladed rotor can be damaged during operation so that repair of an integrally bladed rotor becomes necessary after some time by exchanging a damaged rotor blade for a replacement rotor blade. When repairing integrally bladed rotors, inductive high-frequency pressure welding is used in the prior art when an upset pressure on the order of 25 N/mm² to 50 N/mm² is exerted on the joint surfaces in inductive high-frequency pressure welding. As with linear friction welding, the disadvantage also exists with inductive high-frequency pressure welding that special clamping of the blades is required because of the high upset forces. Furthermore, extensive reworking on the joint surfaces is usually necessary as well after joining with inductive high-frequency pressure welding.

A further disadvantage of inductive high-frequency pressure welding is that with inductive high-frequency pressure welding joining processes between the parts to be joined are performed in the solid phase as well as the molten phase of the materials of the parts be joined, which can compromise the structure in the joint area. Consequently, inductive high frequency welding is also associated with numerous disadvantages.

With this as the point of departure, the problem underlying the present invention is to create a new method and apparatus for the manufacturing and/or repair of an integrally bladed rotor.

In accordance with the invention, joining is carried out by diffusion welding.

Within the meaning of the present invention, it is provided to carry out the fabrication and repair of integrally bladed rotors with the aid of diffusion welding. The integrally bladed rotors can be shaped, for example, as a blisk or a bling. In diffusion welding, a clearly lower upset pressure on the order of 1 N/mm² acts on the joint surfaces, so that clamping collars required according to the prior art in linear friction welding and inductive high-frequency pressure welding can be dispensed with and consequently it is possible to fix the rotor blades directly at the blade profile of the blades. Furthermore, because of the low upset pressure, the danger of mechanically uncontrolled distortion is reduced so that less rework has to be performed on the joint surfaces after joining. In addition, diffusion welding is carried out exclusively in the solid phase of the materials of the parts to be joined so that the structure in the joint area is not negatively affected. The danger of localized bonding or joining failures is minimized.

In accordance with an advantageous further development of the invention, the method and apparatus in accordance with the invention is used for the repair of an integrally bladed rotor, where at least one rotor blade to be replaced is separated from the integrally bladed rotor forming a humped blade stub, and where a replacement blade is joined to the specific blade stub by inductive diffusion welding.

Under an alternative advantageous further development of the invention, the method and apparatus in accordance with the invention is used for the fabrication of an integrally bladed rotor, where rotor blades are joined by inductive diffusion welding to the main rotor body, specifically to humped protrusions on the rotor body.

Under another alternative advantageous further development of the invention, to fabricate an integrally bladed rotor all blades are attached simultaneously to the main rotor body by diffusion welding in a vacuum oven, specifically to the humped protrusions on the rotor body.

Preferred further developments of the invention emerge from the following description. Embodiments of the invention are explained in more detail using the drawings, without being restricted thereto.

DETAILED DESCRIPTION OF THE DRAWINGS

In what follows, the invention will be described in greater detail with reference to FIGS. 1 and 2.

Figure 1:
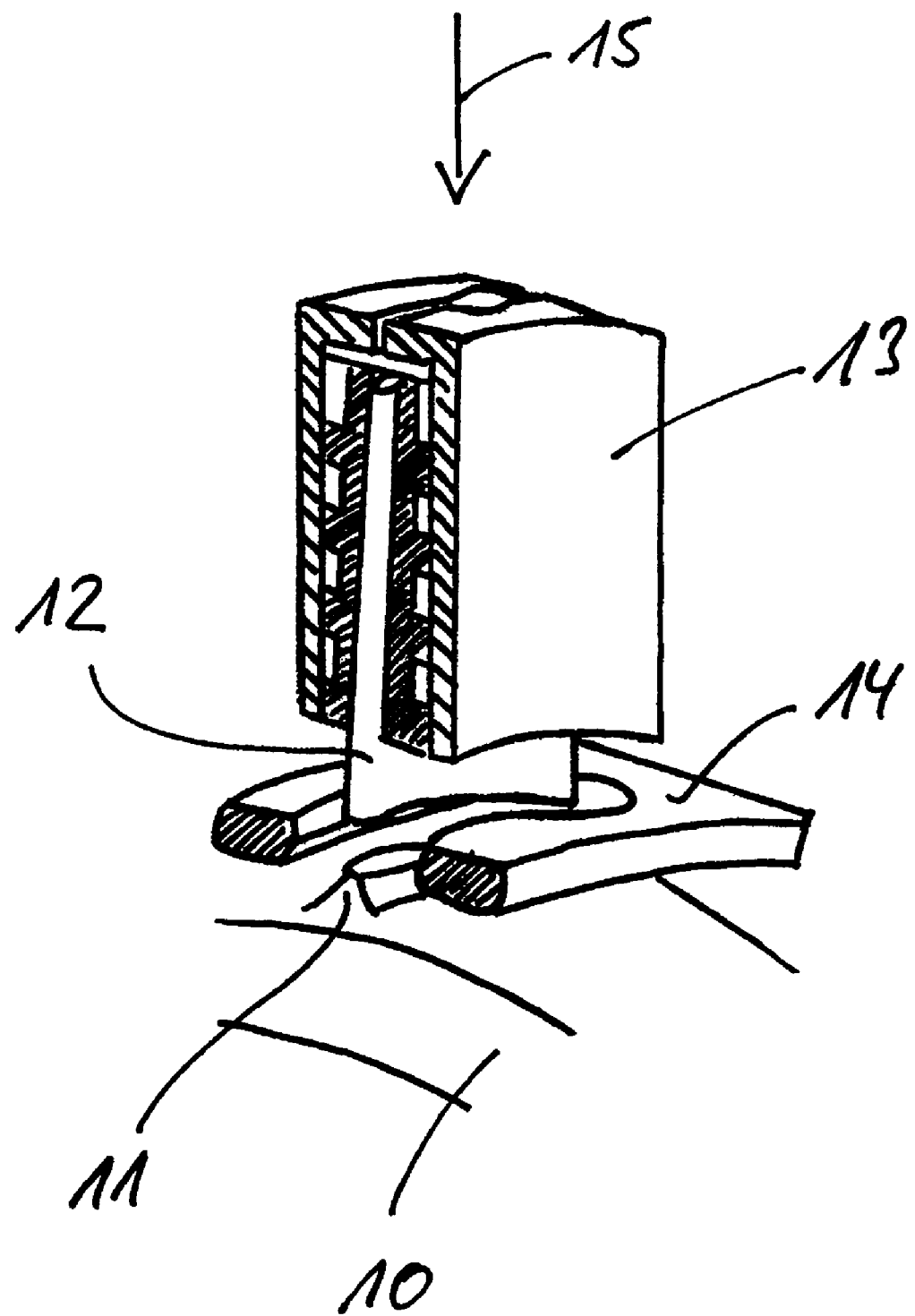
FIG. 1 shows a section from an integrally bladed rotor during repair of the rotor in the meaning of the method and apparatus in accordance with the invention in a schematized, perspective side view along with a sectioned holding fixture for a rotor blade to be attached.

With reference to FIG. 1, the method and apparatus in accordance with the invention is described in conjunction with the repair of an integrally bladed rotor 10, where in the illustration from FIG. 1 of the integrally bladed rotor 10 a blade to be replaced has already been removed, forming a humped blade stub 11. In the sense of the present invention, a replacement blade 12 is attached to the blade stub 11 of the integrally bladed rotor 10 by diffusion welding, where the replacement rotor blade 12 is clamped immediately in the area of its vane in a holding fixture 13.

The integrally bladed rotor can be shaped, for example, as a blisk or a bling.

In the repair of an integrally bladed rotor 10, in accordance with the invention diffusion welding is performed as inductive diffusion welding. For this, an induction coil 14 is positioned in the area of the joint surface to be created, where heating of the integrally bladed rotor 10 to be repaired takes place through the induction coil 14 solely in the joint area between the humped blade stub 11 and the adjoining area of the replacement blade 12. The integrally bladed rotor 10 and the replacement rotor blade 12 are heated only in the joint area by the induction coil 14. With titanium alloys, the temperature required for inductive diffusion welding is on the order of 900° C. and 950° C., where the temperature can be measured, for example, using a pyrometer or thermocouple and thereby can be regulated to a constant value.

With inductive diffusion welding, an upset force is exerted on the parts to be joined, that is to the replacement blade 12, in the direction of the arrow 15 in such a way that in the area of the joint surface between the humped blade stub 11 and the replacement blade 12 an upset force results on the order between 0.5 N/mm$^2$ to 5 N/mm$^2$, preferably of about 1 N/mm$^2$. To provide such a low upset force, low upset forces are adequate, so that as FIG. 1 shows, the replacement rotor blade 12 can be clamped immediately in the area of its vane in the holding fixture.

With inductive diffusion welding, the process time for joining the parts to be connected is on the order of 1 to 2 hours. Because of this relatively long process time, homogenous heating can be achieved in the joint area between the humped blade stub 11 and the replacement rotor blade 12 so that the danger of localized joint failures is minimized. In addition, inductive diffusion welding is carried out solely in the solid phase of the materials of the parts to be connected, which is also of advantage for the material structure in the joint area.

At this juncture it should be pointed out that inductive diffusion welding for joining the replacement rotor blade 12 to the integrally bladed rotor 10 is performed under vacuum or an inert gas atmosphere. Argon is preferably used as the inert gas.

Using the method and apparatus described with reference to FIG. 1 for the repair of an integrally bladed rotor 10, several rotor blades can be joined to a main rotor body in the area of blade stubs in parallel or simultaneously. In addition, the method described with reference to FIG. 1 can also be used for producing new parts and consequently for the fabrication of an integrally bladed rotor.

Figure 2:
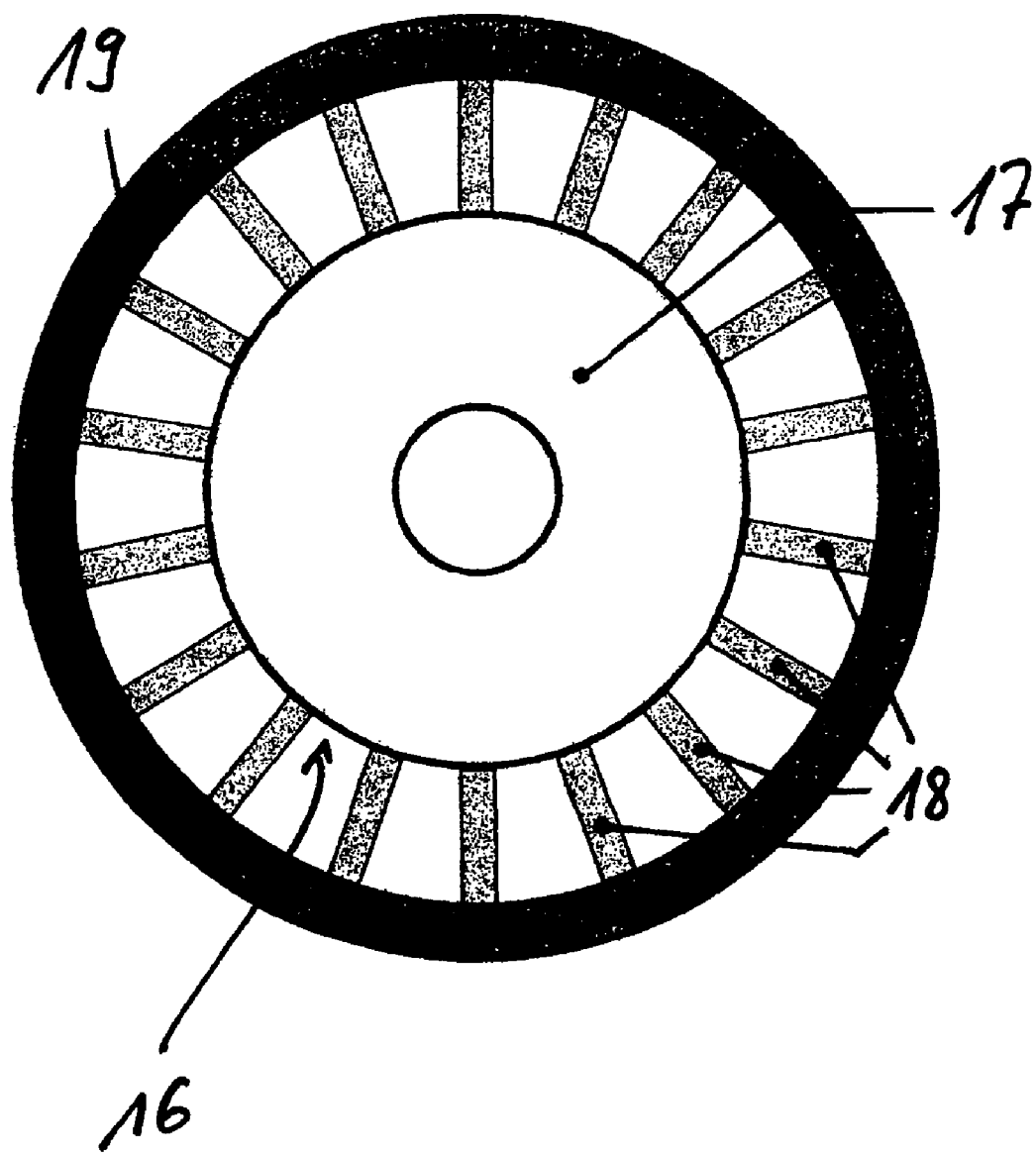
FIG. 2 shows an integrally bladed rotor during fabrication of the rotor in the sense of the method and apparatus in accordance with the invention in a schematized front view along with an annular clamping fixture.

With reference to FIG. 2, a preferred variant of the method and apparatus in accordance with the invention is described in the production of new parts, thus in the fabrication of an integrally bladed rotor 16. In accordance with FIG. 2, the integrally bladed rotor 16 comprises a disk-shaped main rotor body 17, where several rotor blades 18 are joined to the disk-shaped main rotor body 17 by diffusion welding. The joining of the blades 18 to the main rotor body preferably again takes place in the area of humped protrusions which are not shown in FIG. 1.

In the embodiment from FIG. 2, the joining of the rotor blades 18 to the main rotor body 17 takes place by diffusion welding in a vacuum oven, when all blades 18 are attached to the main rotor body 17 simultaneously. For this, all the blades 18 are clamped into corresponding holding fixtures (similar to the holding fixture 13 from the embodiment from FIG. 1) in the area of their vanes which are carried on an annular clamping device 19. The annular clamping device 19 consequently connects all the holding fixtures for the vanes of the rotor blades 18. The annular clamping device 19 is made from a material which has a lower coefficient of thermal expansion than the material of the rotor blades 18 to be joined to the main rotor body 17. If the arrangement from FIG. 2 is heated as a whole in a vacuum oven to the process temperature required for diffusion welding, the main rotor body 17, rotor blades 18 and the annular clamping device 19 expand, where the expansion of the clamping device 19 is less than the expansion of the rotor blades 18. As a result, an upset force acts on the rotor blades 18 and thus an upset force in the area of the joint surface between the rotor blades 18 and the main rotor body 17. This upset pressure in the area of the joint surfaces is again preferably on the order of about 1 N/mm and is provided solely through the different coefficients of expansion of the materials of rotor blades 18 and annular clamping device 19. In this manner, the upset force required for diffusion welding can be provided in a particularly simple manner.

What is claimed is:

1. A method for fabrication of an integrally bladed rotor, comprising the steps of:

clamping a first and a second rotor blade in a first and a second holding fixture respectively, wherein the first and second holding fixtures are carried on an annular clamping device;

heating the first and second rotor blades, the first and second holding fixtures, a rotor body, and the annular clamping device in a vacuum oven;

applying a force on a respective joint area between the first and second rotor blades and a first and a second humped protrusion on the rotor body by expanding the annular clamping device less than the first and second rotor blades during the heating step;

joining the first rotor blade to the first humped protrusion on the rotor body by diffusion welding; and joining the second rotor blade to the second humped protrusion on the rotor body by diffusion welding.

2. The method according to claim 1, wherein the diffusion welding process is performed only in a solid phase of a material of the first and second rotor blades and the first and second humped protrusions.

3. The method according to claim 1, wherein the force is between 0.5 N/mm$^2$ and 5 N/mm$^2$.

* * * * *